(12) United States Patent
Ikeda et al.

(10) Patent No.: US 9,127,988 B2
(45) Date of Patent: Sep. 8, 2015

(54) HEAT FLUX MEASUREMENT APPARATUS AND HEAT FLUX MEASUREMENT METHOD

(75) Inventors: Yuji Ikeda, Kobe (JP); Atsushi Nishiyama, Kobe (JP); Takashi Furui, Kobe (JP)

(73) Assignee: IMAGINEERING, INC., Hyogo (JP)

( * ) Notice: Subject to any disclaimer, the term of this patent is extended or adjusted under 35 U.S.C. 154(b) by 0 days.

(21) Appl. No.: 13/499,762

(22) PCT Filed: Oct. 4, 2010

(86) PCT No.: PCT/JP2010/067399
§ 371 (c)(1),
(2), (4) Date: Jun. 15, 2012

(87) PCT Pub. No.: WO2011/040634
PCT Pub. Date: Apr. 7, 2011

(65) Prior Publication Data
US 2012/0243571 A1    Sep. 27, 2012

(30) Foreign Application Priority Data

Oct. 2, 2009 (JP) ................................. 2009-231045

(51) Int. Cl.
*G01K 17/00* (2006.01)
*G01K 17/20* (2006.01)

(52) U.S. Cl.
CPC ................ *G01K 17/00* (2013.01); *G01K 17/20* (2013.01)

(58) Field of Classification Search
CPC ........... G01K 7/02; G01K 17/006; G01J 5/12; G01J 2005/106; G01F 1/6888; G01F 1/698
See application file for complete search history.

U.S. PATENT DOCUMENTS 3,339,398 A * 9/1967 Barrall, II et al. ............... 374/11
3,767,470 A * 10/1973 Hines ............................. 136/225

(Continued)

(56) References Cited

FOREIGN PATENT DOCUMENTS

| JP | 50-020688 U | 3/1975 |
| JP | 8-094454 A | 4/1996 |

(Continued)

OTHER PUBLICATIONS

International Search Report of PCT/JP2010/067399, mailing date Feb. 15, 2011.

*Primary Examiner* — Lisa Caputo
*Assistant Examiner* — Nasir U Ahmed
(74) *Attorney, Agent, or Firm* — Westerman, Hattori, Daniels & Adrian, LLP

(57) ABSTRACT

A heat flux measurement apparatus 100 includes a first measurement unit 110, a second measurement unit 120, and heat flux calculation units 130, 140. The first measurement unit 110 measures a temperature difference between a first measurement location and a second measurement location that is lower in temperature than the first measurement location, using a thermocouple 112. The second measurement unit 120 measures a temperature difference between a third measurement location that can be assumed to be isothermal with the first measurement location and a fourth measurement location that can be assumed to be isothermal with the second measurement location, using a thermocouple 122 different in time constant from the thermocouple 112. The heat flux calculation units 130, 140 use measured temperature differences respectively acquired from thermal electromotive forces of the thermocouples 112, 113 of the measurement units 110, 120, and time differential values of the actual measured temperature differences of the respective measurement units 110, 120 to detect a time constant of the thermocouple 112, 122 of at least one of the measurement units 110, 120, calculate a compensated temperature difference by compensating a response lag of the actual measured temperature difference by the detected time constant, and calculate a heat flux based on the compensated temperature difference.

1 Claim, 3 Drawing Sheets

(56) References Cited

U.S. PATENT DOCUMENTS

| | | | |
|---|---|---|---|
| 4,050,302 A * | 9/1977 | Haupin | 374/30 |
| 4,583,867 A * | 4/1986 | Gautheret | 374/113 |
| 4,779,994 A * | 10/1988 | Diller et al. | 374/29 |
| 5,288,147 A * | 2/1994 | Schaefer et al. | 374/10 |
| 6,331,074 B1 * | 12/2001 | Kimura | 374/10 |
| 6,402,369 B1 * | 6/2002 | Ludington et al. | 374/13 |
| 6,518,597 B1 * | 2/2003 | Kim | 257/82 |
| 7,258,482 B2 * | 8/2007 | Hutter et al. | 374/13 |
| 7,470,057 B2 * | 12/2008 | Danley | 374/13 |
| 7,588,366 B2 * | 9/2009 | Kinoshita | 374/12 |
| 2003/0219060 A1 * | 11/2003 | Sloneker et al. | 374/112 |
| 2009/0198096 A1 * | 8/2009 | Martin et al. | 600/37 |

FOREIGN PATENT DOCUMENTS

| | | |
|---|---|---|
| JP | 2003-130737 A | 5/2003 |
| JP | 2005-337750 A | 12/2005 |

* cited by examiner

HEAT FLUX MEASUREMENT APPARATUS AND HEAT FLUX MEASUREMENT METHOD

TECHNICAL FIELD

The present invention relates to a heat flux measurement apparatus and heat flux measurement method that measures a heat flux.

BACKGROUND ART

As an example of a heat flux measurement apparatus, Patent Document 1 discloses a heat flux meter provided on a cylinder wall of an engine. In the heat flux meter, a pair of temperature measuring points of a thermocouple are provided on a heat conductive body that is threadably engaged in a threaded hole on the cylinder wall of the engine. The pair of temperature measuring points of the thermocouple are arranged at different locations in a thickness direction of the cylinder wall. The heat flux meter measures a heat flux flowing in the thickness direction of the cylinder wall based on a difference between temperatures measured at the two temperature measuring points.

PRIOR ART DOCUMENT

Patent Document

Patent Document 1: Japanese Patent Application Publication No. 2003-130737

DISCLOSURE OF THE INVENTION

Problems to be Solved by the Invention

However, since a wire has heat capacity, a response lag occurs in a thermocouple in accordance with the thickness of the wire. Accordingly, a conventional heat flux measurement apparatus may fail to acquire a sufficient time resolution while measuring a heat flux.

The present invention has been made in view of the above-mentioned facts, and it is an object of the present invention to improve time resolution in a heat flux measurement apparatus and heat flux measurement method that measures a heat flux.

Means for Solving the Problems

A first aspect of the present invention is a heat flux measurement apparatus, comprising: a first measurement unit that measures a temperature difference between a first measurement location and a second measurement location that is lower in temperature than the first measurement location, using a thermocouple; a second measurement unit that measures a temperature difference between a third measurement location that can be assumed to be isothermal with the first measurement location and a fourth measurement location that can be assumed to be isothermal with the second measurement location, using a thermocouple different in time constant from the thermocouple of the first measurement unit; and a heat flux calculation unit that, using measured temperature differences respectively acquired from thermal electromotive forces of the thermocouples of the respective measurement units and time differential values of the actual measured temperature differences of the respective measurement units, detects a time constant of the thermocouple of at least one of the measurement units, calculates a compensated temperature difference by compensating a response lag of the actual measured temperature difference using the detected time constant, and calculates a heat flux based on the compensated temperature difference.

In accordance with a first aspect of the present invention, an actual measured temperature difference between a first measurement location and a second measurement location is acquired based on a thermal electromotive force of a thermocouple of a first measurement unit. An actual measured temperature difference between a third measurement location and a fourth measurement location is acquired based on a thermal electromotive force of a thermocouple of a second measurement unit. Based on time variations of the actual measured temperature differences, time differential values thereof are respectively acquired. Here, a temperature difference (hereinafter, referred to as a "compensated temperature difference") acquired by compensating a response lag of the actual measured temperature difference can be expressed with a relational expression using the actual measured temperature difference, the time differential of the actual measured temperature difference, and a time constant as variables (see Expressions 3 and 4, which will be described later). Here, the thermocouples of the first and second measurement units are different from each other in time constant. Meanwhile, the first and third measurement locations can be assumed to be isothermal with each other and the second and fourth measurement points can be assumed to be isothermal with each other. This means that the compensated temperature differences of the first and second thermocouples can be assumed to be equal to each other. Therefore, by using the above relationship, it is possible to calculate time constants of the respective thermocouples. If the time constant of the thermocouple of at least one of the measurement units is known, the compensated temperature difference is derived, and thus, a heat flux is derived from the compensated temperature difference. Accordingly, in accordance with the first aspect of the present invention, since a temperature difference is measured between locations that can be assumed to be isothermal with each other, using at least two thermocouples different in time constant from each other, it is possible to detect the time constant, accordingly, it is possible to calculate a heat flux using the time constant.

A second aspect of the present invention is a heat flux measurement apparatus as set forth in claim 1, wherein the first measurement unit includes a first thermocouple having a hot junction provided in the first measurement location and a cold junction provided in the second measurement location, the second measurement unit includes a second thermocouple having a hot junction provided in the third measurement location and a cold junction provided in the fourth measurement location, and the first thermocouple and the second thermocouple are different in time constant from each other.

A third aspect of the present invention is a heat flux measurement apparatus as set forth in claim 1, wherein the first measurement unit includes a first hot side thermocouple having a hot junction provided in the first measurement location, a first cold side thermocouple having a hot junction provided in the second measurement location, the second measurement unit includes a second hot side thermocouple having a hot junction provided in the third measurement location, a second cold side thermocouple having a hot junction provided in the fourth measurement location, the first hot side thermocouple and the second hot side thermocouple are different in time constant from each other, and the first cold side thermocouple and the second cold side thermocouple are different in time constant from each other.

A fourth aspect of the present invention is a heat flux measurement method, comprising: a measuring step of detecting a temperature difference between a first measurement location and a second measurement location that is lower in temperature than the first measurement location, using a first thermocouple, at the same time, detecting a temperature difference between a third measurement location that can be assumed to be isothermal with the first measurement location and a fourth measurement location that can be assumed to be isothermal with the second measurement location, using a second thermocouple different in time constant from the first thermocouple; a heat flux calculation step of, using actual measured temperature differences respectively acquired from thermal electromotive forces of the respective thermocouples and time differential values of the actual measured temperature differences of the respective measurement units, detecting a time constant of at least one of the thermocouples, calculating a compensated temperature difference by compensating a response lag of the actual measured temperature difference by the detected time constant; and calculating step of calculating a heat flux based on the compensated temperature difference.

Effect of the Invention

According to the present invention, since a temperature difference is measured between locations that can be assumed to be isothermal with each other, using at least two thermocouples different in time constant from each other, the time constant can be detected, and a heat flux can be calculated using the time constant. The heat flux value calculated from the time constants is an instantaneous value free from response lag. Since response lag of the thermocouple of one measurement unit is compensated using the thermocouple of the other measurement unit, it is possible to acquire the instantaneous value of the heat flux. As a result of this, it is possible to enhance the time resolution of the heat flux measurement apparatus or heat flux measurement method.

BEST MODE OF CARRYING OUT THE PRESENT INVENTION

In the following, a detailed description will be given of the present invention with reference to drawings. It should be noted that the following embodiments are mere examples that are essentially preferable, and are not intended to limit the scope of the present invention, applied field thereof, or application thereof.

Figure 1:
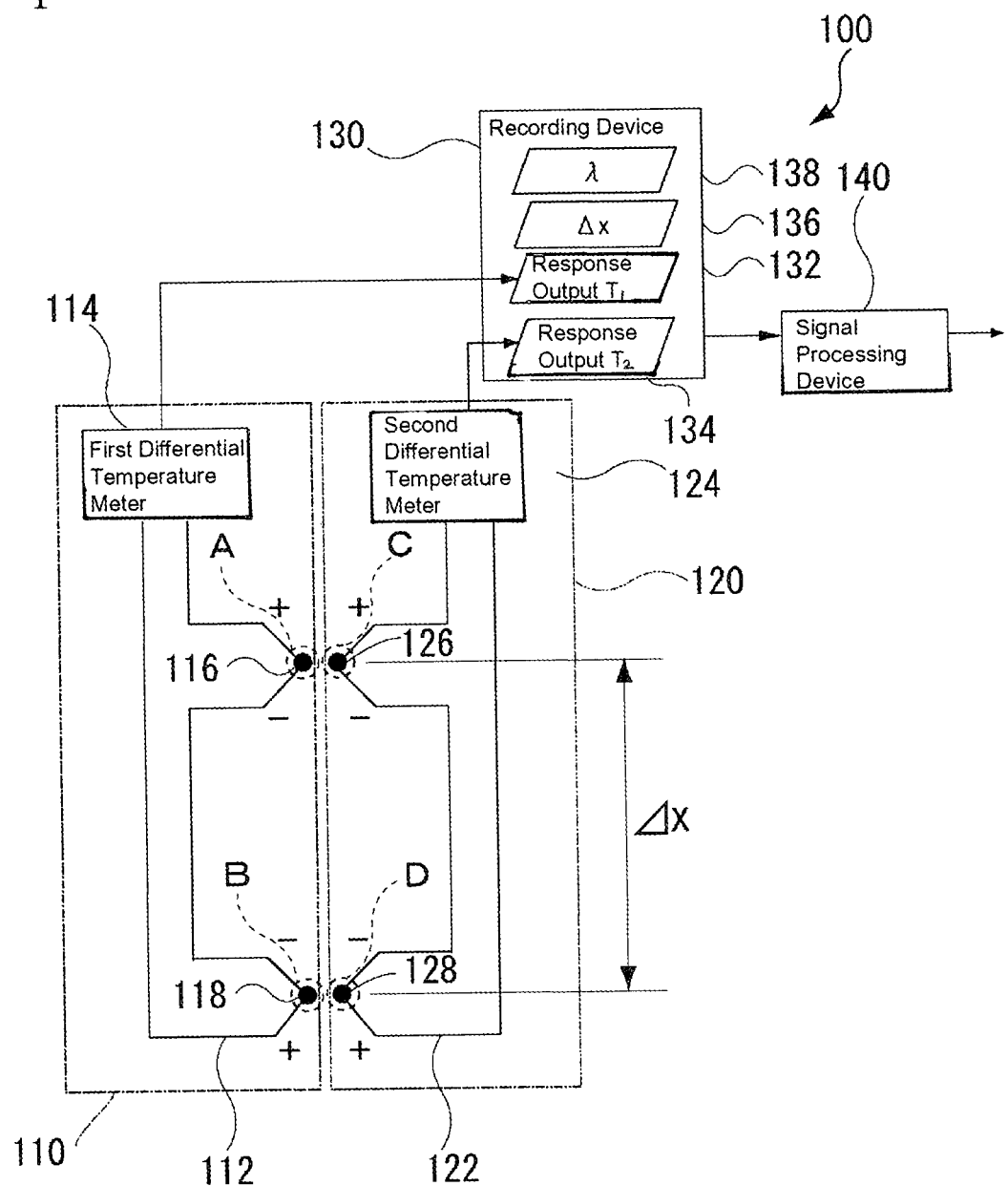
FIG. 1 is a schematic configuration diagram of a heat flux measurement apparatus.

The present embodiment is constituted by a heat flux measurement apparatus 100 according to the present invention. The heat flux measurement apparatus 100 of the present embodiment is shown in FIG. 1 as including a first measurement unit 110, a second measurement unit 120, a recording device 130, and a signal processing device 140.

The first measurement unit 110 uses a first thermocouple 112 to measure a temperature difference between a measurement location A (a first measurement location) and a measurement location B (a second measurement location) that is lower in temperature than the measurement location A. The measurement locations A and B may be on a surface of a measurement target or may be inside a measurement target.

The first measurement unit 110 includes the first thermocouple 112 and a first differential temperature meter 114. The first thermocouple 112 includes a first measuring hot junction 116 and a second measuring hot junction 118. The first measuring hot junction 116 is disposed at the measurement location A, and the second measuring hot junction 118 is disposed at the measurement location B. The first differential temperature meter 114 calculates a temperature difference (actual measured temperature difference) between the two measuring hot junctions A and B based on the electromotive force of the first thermocouple 112, and sequentially outputs the calculation result.

The second measurement unit 120 uses a second thermocouple 122 different in time constant from the first thermocouple 112, to measure a temperature difference between a measurement location C (a third measurement location) and a measurement location D (a fourth measurement location). As the measurement location C, a location is selected that is assumed to be isothermal with the measurement location A. As the measurement location D, a location is selected that is assumed to be isothermal with the measurement location B. For example, the measurement location C is a location in close vicinity of the measurement location A, and the measurement location D is a location in close vicinity of the measurement location B. Both of the distance between the measurement locations A and C and the distance between the measurement locations B and D are extremely short in comparison with a distance delta x of a measurement target interval.

The second measurement unit 120 includes the second thermocouple 122 and a second differential temperature meter 124. The second measurement unit 120 is different in thermal inertia from the first measurement unit 110. The second thermocouple 122 is a thermocouple that is different in time constant from the first thermocouple 112. The second thermocouple 122 is different in strand diameter from the first thermocouple 112. The second thermocouple 122 includes a third measuring hot junction 126 and a fourth measuring hot junction 128. The third measuring hot junction 126 is disposed at the measurement location C, and the fourth measuring hot junction 128 is disposed at the measurement location D. The second differential temperature meter 124 calculates a temperature difference (actual measured temperature difference) between the two measuring hot junctions C and D based on the electromotive force of the second thermocouple 122, and sequentially outputs the calculation result.

The recording device 130 and the signal processing device 140 constitutes heat flux calculation units 130 and 140 that use actual measured temperature differences respectively acquired from thermal electromotive forces of the thermocouples 112 and 122 of the measurement units 110 and 120 and time differential values of the actual measured temperature differences of the respective measurement units 110 and 120 to detect time constant(s) of the thermocouples 112 and/or 122 of at least one of the measurement units 110 and 120, calculate a compensated temperature difference by compensating a response lag of the actual measured temperature difference using the detected time constant, and calculate a heat flux from the compensated temperature difference.

The recording device 130 is connected with the first measurement unit 110 and the second measurement unit 120. The recording device 130 records a response output (measurement result of the actual measured temperature difference) from the first measurement unit 110 and a response output (measurement result of the actual measured temperature difference) from the second measurement unit 120. The recording device 130 accumulates a response output 132 (first response output) from the first differential temperature meter 114 and a response output 134 (second response output) from the second differential temperature meter 124 as well.

The recording device 130 accumulates the output signal 132 of the first differential temperature meter 114 and the output signal 134 of the second differential temperature meter 124 in a digital format. The first differential temperature meter 114 and the second differential temperature meter 124 are equipped with A/D converters.

The recording device 130 retains in advance data 136 of the distance delta x between the measurement locations A and B and data 138 of a thermal conductivity lambda between the measurement locations A and B. The distance delta x may be measured and stored in the recording device 130 in advance, for example, at a time when the measurement locations A and B are set. With regard to the thermal conductivity lambda, if the measurement target is made of known material, a literature value or the like related to the material may be stored in the recording device 130. Otherwise, the thermal conductivity lambda may be measured and stored in the recording device 130 in advance.

The signal processing apparatus 140 performs conversion processing of the measurement results recorded in the recording device 130 into a heat flux. The signal processing apparatus 140 performs a heat flux calculation step, which will be described later.

Figure 2:
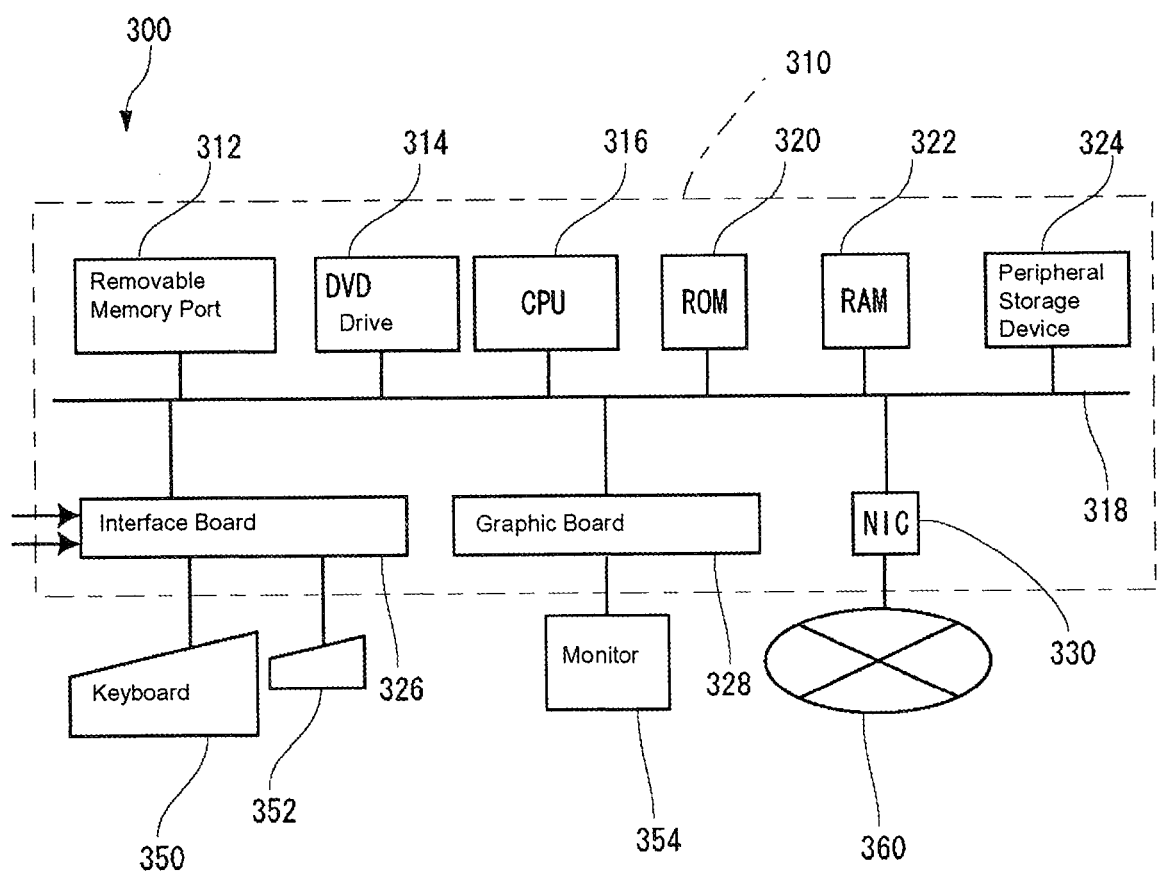
FIG. 2 is an internal configuration diagram of a computer hardware for implementing a signal processing device.

The recording device 130 and the signal processing apparatus 140 are substantially implemented by a system having computer hardware and programs and data retained in the computer hardware. FIG. 2 shows an internal configuration of the computer hardware 300 constituting the system.

The computer hardware 300 is provided with a computer 310, a keyboard 350, a pointing device 352 such as a mouse, and a monitor 354. The computer 310 includes a removable memory port 312 for a removable memory device and a DVD (Digital Versatile Disc) drive 314. The keyboard 350 is configured so as to be capable of input operations of character information and commands.

The computer 310 is provided with the memory port 312, the DVD drive 314, a CPU (Central Processing Unit) 316, a bus 318, a ROM (Read Only Memory) 320, a RAM (Random Access Memory) 322, a peripheral storage device 324, an interface board 326, a graphic board 328, and an NIC (Network Interface Card) 330. The bus 318 is connected with the memory port 312, the DVD drive 314, the CPU 316, the ROM 320, the RAM 322, the peripheral storage device 324, the interface board 326, the graphic board 328, and the NIC 330. The ROM 320 stores a boot up program and the like. The RAM 322 stores program instructions, system programs, working data, and the like. The peripheral storage device 324 is constituted by a hard disc drive or a semiconductor storage device drive or the like, and stores and accumulates programs, system programs, data, and the like. The interface board 326 serves to connect the computer 310 with the keyboard 350, the pointing device 352, and other peripheral devices. The interface board 326 of the recording device 130 is connected with the first and second differential temperature meters 114 and 124. The graphic board 328 performs image processing and outputs images to the monitor 354. The NIC 330 provides a connection to a LAN (Local Area Network) 360 for communicating with other computers.

In the recording device 130, a removable media to be inserted in the memory port 312 or the DVD drive 314 stores data (the first and second response outputs). The data stored in the removable media is transferred to the peripheral storage device 324. The data may be stored in the peripheral storage device 324 via the interface board 326 from a peripheral device that is connected with the interface board 326.

A program (program for executing a heat flux calculation step, which will be described later) for operating the recording device 130 and the signal processing device 140 is stored in a removable media to be inserted in the memory port 312 or the DVD drive 314. The program stored in the removable media is transferred to the peripheral storage device 324. The program may be transferred to the computer 310 via the LAN 360 and stored in the peripheral storage device 324. The program is loaded into the RAM 322 at the time of execution. The program may be loaded into the RAM 322 from the removable media or directly via the LAN 360.

The program includes a plurality of instructions to cause the recording device 130 and the signal processing device 140 to operate. Fundamental functions necessary for the recording device 130 and the signal processing device 140 to operate are partly provided by an OS (Operating System) or a third party program running on the computer 310. Therefore, the program is not required to include all of the functions necessary for the recording device 130 and the signal processing device 140 of the present embodiment to operate. Since intrinsic operations of the computer system 300 are well known, a description thereof is omitted here.

A heat flux measurement method for measuring a heat flux will be described below. In the heat flux measurement method, a measurement step and a heat flux calculation step are carried out.

In the measurement step, a temperature difference is detected, by way of the first thermocouple 112, between the measurement location A and the measurement location B that is lower in temperature than the measurement location A. At the same time, a temperature difference is detected, by way of the second thermocouple 122 having a different time constant from that of the first thermocouple 112, between the measurement location C, which is assumed to be isothermal with the measurement location A, and the measurement location D, which is assumed to be isothermal with the measurement location B. In the measurement step, the first and second measurement units 110 and 120 sequentially output the actual measured temperature differences (the first and second response outputs), and the recording device 130 records the outputted actual measured temperature differences.

Figure 3:
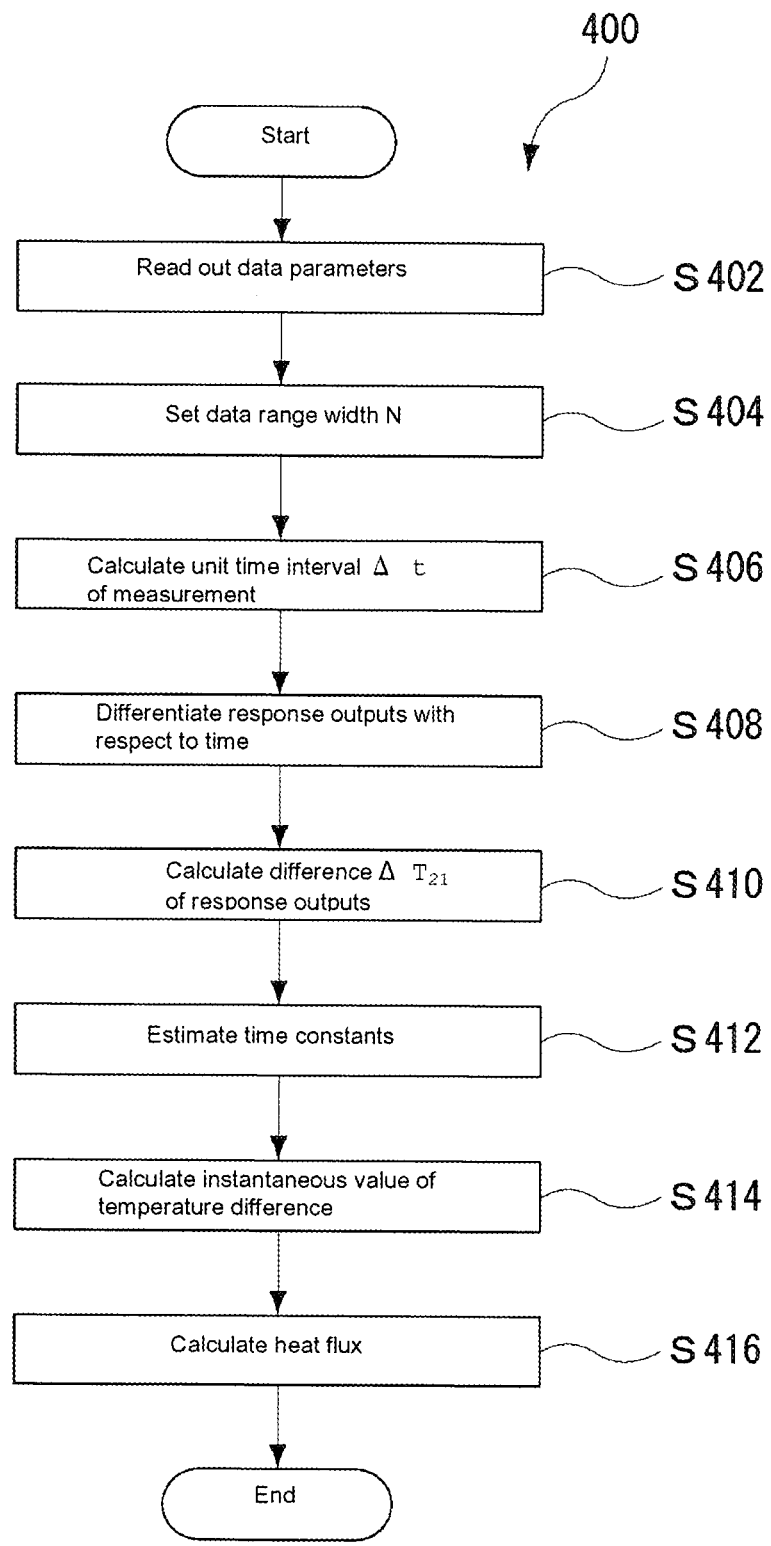
FIG. 3 is a flowchart illustrating a heat flux calculation step.

FIG. 3 shows a flowchart 400 of the heat flux calculation step. In the present embodiment, the signal processing device 140 carries out the heat flux calculation step. The signal processing device 140 carries out the heat flux calculation step in accordance with an installed program.

In the heat flux calculation step, time constant(s) of at least one of the thermocouples 112 and 122 are detected from the actual measured temperature differences acquired from respective thermal electromotive forces of the thermocouples 112 and 122 and time differential values of the respective actual measured temperature differences of the thermocouples 112 and 122, a compensated temperature difference is calculated by compensating a response lag of the actual measured temperature difference using the detected time constant, and a heat flux is calculated from the compensated temperature difference.

More particularly, in the heat flux calculation step, Step 402 is firstly executed. In Step 402, parameters used in processes of the program are read out. In Step 404, a data range width N (number of times of measurements) is set for calculating the time constants of the first response output T1 and the second response output T2 (see FIG. 1) with respect to the temperature differences. In Step 406, a time interval delta t at which the actual measured temperature differences have been measured is calculated from a reciprocal of the sampling frequency at the time of A/D conversion. In step S408, the time differential value G1 of the first response output T1 and the time differential value G2 of the second response output T2 are calculated. The time differential G1 of the first response output T1 is calculated by Expression 1, and the time differential G2 of the second response output T2 is calculated by Expression 2.

$$G1 = dT1/dt \qquad (1)$$

$$G2 = dT2/dt \qquad (2)$$

Next, in Step 410, a difference delta T21 (delta T21=T2−T1) is calculated between the first and second response outputs T1 and T2 at each time point when the actual measured temperature difference is measured. In Step 412, a time constant tau1 of the response lag of the first measurement unit 110 and a time constant tau2 of the response lag of the second measurement unit 120 are estimated by means of the least square method based on a relative relationship of the time constants of the response lags. More particularly, for each time point of measurement, a compensated temperature difference Tg1 of the first measurement unit 110 after the response lag is compensated is expressed by Expression 3 using the time constant tau1, and a compensated temperature difference Tg2 of the second measurement unit 120 after the response lag is compensated is expressed by Expression 4 using the time constant tau2. Ideally, Tg1 and Tg2 should coincide with each other after compensation. Therefore, in Step 412, time constants tau1 and tau2 are acquired so as to minimize a mean square value e of a difference between Tg1 and Tg2, which is shown in Expression 5.

$$Tg1 = T1 + \tau_1 G1 \qquad (3)$$

$$Tg2 = T2 + \tau_2 G2 \qquad (4)$$

$$e = \frac{1}{N} \sum_{i=1}^{N} (T_{g2}^i - T_{g1}^i)^2 \qquad (5)$$

$$\left.\begin{array}{l} \frac{\partial e}{\partial \tau_1} = 0 \\ \frac{\partial e}{\partial \tau_2} = 0 \end{array}\right\} \qquad (6)$$

Here, Expression 6 is assumed as shown above. In Expression 7, a variable with bar denotes a mean value of the variable. Assuming tau1 and tau2 are constant, tau1 and tau2 at each time point of measurement are equal to the respective mean values thereof. By expanding Expression 5 using Expressions 3 and 4, the mean value of tau1 is expressed by Expression 7, and the mean value of tau2 is expressed by Expression 8.

$$\overline{\tau_1} = \frac{\frac{1}{N}\sum_{i=1}^{N}\left(\frac{dT_2}{dt}\right)^2 \cdot \frac{1}{N}\sum_{i=1}^{N}\left(\frac{dT_1}{dt}\right)(T_2 - T_1) - \frac{1}{N}\sum_{i=1}^{N}\left(\frac{dT_1}{dt}\cdot\frac{dT_2}{dt}\right) \cdot \frac{1}{N}\sum_{i=1}^{N}\left(\frac{dT_2}{dt}\right)(T_2 - T_1)}{\frac{1}{N}\sum_{i=1}^{N}\left(\frac{dT_1}{dt}\right)^2 \cdot \frac{1}{N}\sum_{i=1}^{N}\left(\frac{dT_2}{dt}\right)^2 - \left(\frac{1}{N}\sum_{i=1}^{N}\frac{dT_1}{dt}\cdot\frac{dT_2}{dt}\right)^2} \qquad (7)$$

$$\overline{\tau_2} = \frac{\frac{1}{N}\sum_{i=1}^{N}\left(\frac{dT_1}{dt}\cdot\frac{dT_2}{dt}\right) \cdot \frac{1}{N}\sum_{i=1}^{N}\left(\frac{dT_1}{dt}\right)(T_2 - T_1) - \frac{1}{N}\sum_{i=1}^{N}\left(\frac{dT_1}{dt}\right)^2 \cdot \frac{1}{N}\sum_{i=1}^{N}\left(\frac{dT_2}{dt}\right)(T_2 - T_1)}{\frac{1}{N}\sum_{i=1}^{N}\left(\frac{dT_1}{dt}\right)^2 \cdot \frac{1}{N}\sum_{i=1}^{N}\left(\frac{dT_2}{dt}\right)^2 - \left(\frac{1}{N}\sum_{i=1}^{N}\frac{dT_1}{dt}\cdot\frac{dT_2}{dt}\right)^2} \qquad (8)$$

Next, in Step 414, the compensated temperature difference Tg1 is calculated using Expression 3 from the actual measured temperature difference T1, the time differential value G1 calculated in Step 408, and the time constant tau1 calculated in Step 412. Finally, in Step 416, a heat flux q=lambda Tg1/delta x is calculated based on the thermal conductivity lambda and the distance delta x, and the calculation result is outputted as an instantaneous value of the heat flux. Thus, the calculation operation ends.

Effect of Embodiment

In the above-described embodiment, since the time constants can be detected by measuring a temperature difference between locations that can be assumed to be equal in temperature difference to each other, using the thermocouples 112 and 122 that are different in time constant from each other, respectively, a heat flux is calculated using the time constants. The heat flux value calculated from the time constants is an instantaneous value free from response lag. As a result of this, it is possible to enhance the time resolution of the heat flux measurement apparatus 100 or heat flux measurement method.

Other Embodiments

The above-described embodiment can also be configured as follows.

In the above-described embodiment, the above-described first measurement unit 110 may include a first hot side thermocouple having a hot junction provided in the measurement location A and a first cold side thermocouple having a hot junction provided in the measurement location B. Also, the second measurement unit 120 may include a second hot side thermocouple having a hot junction provided in the measurement location C and a second cold side thermocouple having a hot junction provided in the measurement location D. In this case, the first and second hot side thermocouples are different in time constant from each other, and the first and second cold side thermocouples are different in time constant from each other. The first and second hot side thermocouples and the first and second cold side thermocouples are disposed at locations where cold junctions of the first and second hot side thermocouples and the first and second cold side thermocouples are assumed to be isothermal. An instantaneous value of the temperature difference between the measurement location A and the location of the cold junction can be acquired by calculating a time constant of one of the first and second hot side thermocouples using the expressions of the present embodiment. Similarly, an instantaneous value of the temperature difference between the measurement location B and the location of the cold junction can be acquired. From a difference between the two instantaneous values, a temperature difference between the measurement locations A and B is acquired, and finally a heat flux is calculated.

In the above-described embodiment, the thermocouples 112 and 122 have generated electromotive forces by the temperature differences between the measurement locations A and C and between the measurement locations C and D. However, a temperature compensation junction may be provided, or temperature may be measured separately.

Also, in the above-described embodiment, the time constants tau1 and tau2 are calculated by acquiring values that minimize the mean square values of the response outputs T1 and T2. However, based on an assumption that variation wave forms of the temperature differences Tg1 and Tg2, which have been compensated with respect to response, have similarity to each other, the time constants tau1 and tau2 may be calculated by acquiring values that maximize a correlation coefficient between Tg1 and Tg2.

Furthermore, in the above-described embodiment, in a case in which a relative relationship of factors related to response lag, such as a ratio between wire diameters or thermal transfer coefficients of the thermocouples 112 and 122, is known between the first and second measurement units 110 and 120, the time constants calculated based on the relative relationship may be used to compensate the response.

INDUSTRIAL APPLICABILITY

As described in the above, the present invention is useful to a heat flux measurement apparatus and heat flux measurement method that measures a heat flux.

EXPLANATION OF REFERENCE NUMERALS

100 Heat Flux Measurement Apparatus
110 First Measurement Unit
112 First Thermocouple
114 First Differential Temperature meter
120 Second Measurement Unit
122 Second Thermocouple
124 Second Differential Temperature Meter
130 Recording Device (Heat Flux Calculation Unit)
124 Signal Processing Device (Heat Flux Calculation Unit)

The invention claimed is:

1. A heat flux measurement apparatus, comprising:
    a first thermocouple that measures a temperature difference between a first measurement location and a second measurement location;
    a second thermocouple that measures a temperature difference between a third measurement location and a fourth measurement location, wherein
    i) the second thermocouple has a time constant different from the first thermocouple,
    ii) the second thermocouple is aligned such that a distance between the first and third measurement locations is smaller than a distance between the first and second measurement locations, and
    iii) the second thermocouple is aligned such that distance between the second and fourth measurement locations is smaller than the distance between the first and second measurement locations;
    a recording device that,
    (i) stores location data of the first and second measurement locations,
    (ii) stores thermal conductivity data between the first and second measurement locations,
    (iii) accumulates the first temperature difference data measured by the first thermocouple, and
    (iv) accumulates the second temperature difference data measured by the second thermocouple; and
    a heat flux calculation unit that,
    (i) calculates a compensated temperature difference data based on the accumulated first and second temperature difference data stored in the recording device and
    (ii) calculates a heat flux based on the calculated compensated temperature difference data, thermal conductivity data stored in the recording device, and the location data stored in the recording device.

* * * * *